United States Patent
Milliron et al.

(10) Patent No.: US 9,338,280 B2
(45) Date of Patent: May 10, 2016

(54) SYSTEM AND METHOD FOR MANAGING TELEPHONY ENDPOINT INVENTORY

(71) Applicant: Twilio, Inc., San Francisco, CA (US)

(72) Inventors: Timothy S. Milliron, San Francisco, CA (US); Adam Ballai, San Francisco, CA (US); Christopher Corcoran, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

(21) Appl. No.: 14/309,709

(22) Filed: Jun. 19, 2014

(65) Prior Publication Data

US 2014/0376389 A1   Dec. 25, 2014

Related U.S. Application Data

(60) Provisional application No. 61/836,927, filed on Jun. 19, 2013.

(51) Int. Cl.
*H04M 3/22* (2006.01)
*H04M 3/42* (2006.01)

(52) U.S. Cl.
CPC ............ *H04M 3/229* (2013.01); *H04M 3/2263* (2013.01); *H04M 3/42144* (2013.01)

(58) Field of Classification Search
None
See application file for complete search history.

(56) References Cited

U.S. PATENT DOCUMENTS

| | | |
|---|---|---|
| 5,274,700 A | 12/1993 | Gechter et al. |
| 5,526,416 A | 6/1996 | Dezonno et al. |
| 5,581,608 A | 12/1996 | Jreij et al. |
| 5,598,457 A | 1/1997 | Foladare et al. |
| 5,934,181 A | 8/1999 | Adamczewski |
| 6,026,440 A | 2/2000 | Shrader et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |

(Continued)

FOREIGN PATENT DOCUMENTS

| | | | |
|---|---|---|---|
| DE | 1684587 A | | 3/1971 |
| EP | 0282126 A | | 9/1988 |

(Continued)

OTHER PUBLICATIONS

RFC 3986: Uniform Resource Identifier (URI): Generic Syntax; T. Berners-Lee, R. Fielding, L. Masinter; Jan. 2005; The Internet Society.

*Primary Examiner* — Huy D Vu
*Assistant Examiner* — James P Duffy
(74) *Attorney, Agent, or Firm* — Jeffrey Schox

(57) ABSTRACT

A system and method for managing an endpoint repository of a communication platform that includes managing a set of telephone endpoints that can be in an allocated state or an unallocated state; classifying endpoints of the set of telephone endpoints with a set of classifiers; evaluating endpoint inventory across a set of endpoint classification groupings and detecting at least one classification grouping that, based in part on the allocated and unallocated state of corresponding endpoints, satisfies an inventory update condition; generating an endpoint transfer request that specifies the endpoint classifiers of the classification grouping; and selectively adding endpoints from the inventory source to the endpoint repository.

20 Claims, 9 Drawing Sheets

(56) References Cited

U.S. PATENT DOCUMENTS

| | | |
|---|---|---|
| 6,269,336 B1 | 7/2001 | Ladd et al. |
| 6,373,836 B1 | 4/2002 | Deryugin et al. |
| 6,425,012 B1 | 7/2002 | Trovato et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,832 B1 | 12/2002 | Saylor et al. |
| 6,507,875 B1 | 1/2003 | Mellen-Garnett et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 6,999,576 B2 * | 2/2006 | Sacra ................... 379/221.13 |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 * | 9/2006 | Holland ................ 379/201.01 |
| 7,111,163 B1 | 9/2006 | Haney |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 * | 11/2007 | Mo et al. ................ 235/385 |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,715,547 B2 | 5/2010 | Ibbotson et al. |
| 7,779,065 B2 | 8/2010 | Gupta et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 * | 9/2011 | Raleigh .................. 370/252 |
| 8,069,096 B1 | 11/2011 | Ballaro et al. |
| 8,081,958 B2 | 12/2011 | Soederstroem et al. |
| 8,103,725 B2 | 1/2012 | Gupta et al. |
| 8,126,128 B1 | 2/2012 | Hicks, Iii et al. |
| 8,149,716 B2 | 4/2012 | Ramanathan et al. |
| 8,150,918 B1 | 4/2012 | Edelman et al. |
| 8,156,213 B1 | 4/2012 | Deng et al. |

(56) References Cited

U.S. PATENT DOCUMENTS

| | | | |
|---|---|---|---|
| 8,196,133 B2 | 6/2012 | Kakumani et al. | |
| 8,233,611 B1 | 7/2012 | Zettner | |
| 8,243,889 B2 | 8/2012 | Taylor et al. | |
| 8,266,327 B2 | 9/2012 | Kumar et al. | |
| 8,295,272 B2 | 10/2012 | Boni et al. | |
| 8,306,021 B2 | 11/2012 | Lawson et al. | |
| 8,326,805 B1 | 12/2012 | Arous et al. | |
| 8,346,630 B1* | 1/2013 | McKeown | 705/28 |
| 8,355,394 B2 | 1/2013 | Taylor et al. | |
| 8,417,817 B1 | 4/2013 | Jacobs | |
| 8,429,827 B1 | 4/2013 | Wetzel | |
| 8,438,315 B1 | 5/2013 | Tao et al. | |
| 8,462,670 B2 | 6/2013 | Chien et al. | |
| 8,509,068 B2 | 8/2013 | Begall et al. | |
| 8,532,686 B2* | 9/2013 | Schmidt et al. | 455/513 |
| 8,542,805 B2 | 9/2013 | Agranovsky et al. | |
| 8,594,626 B1 | 11/2013 | Woodson et al. | |
| 8,611,338 B2 | 12/2013 | Lawson et al. | |
| 8,649,268 B2 | 2/2014 | Lawson et al. | |
| 8,667,056 B1 | 3/2014 | Proulx et al. | |
| 8,675,493 B2 | 3/2014 | Buddhikot et al. | |
| 8,755,376 B2 | 6/2014 | Lawson et al. | |
| 8,806,024 B1 | 8/2014 | Francis et al. | |
| 8,837,465 B2 | 9/2014 | Lawson et al. | |
| 8,838,707 B2 | 9/2014 | Lawson et al. | |
| 9,014,664 B2 | 4/2015 | Kim et al. | |
| 9,015,702 B2 | 4/2015 | Bhat | |
| 2001/0038624 A1 | 11/2001 | Greenberg et al. | |
| 2001/0043684 A1 | 11/2001 | Guedalia et al. | |
| 2002/0006124 A1 | 1/2002 | Jimenez et al. | |
| 2002/0006125 A1 | 1/2002 | Josse et al. | |
| 2002/0006193 A1 | 1/2002 | Rodenbusch et al. | |
| 2002/0067823 A1 | 6/2002 | Walker et al. | |
| 2002/0077833 A1 | 6/2002 | Arons et al. | |
| 2002/0126813 A1 | 9/2002 | Partovi et al. | |
| 2002/0136391 A1* | 9/2002 | Armstrong | 379/242 |
| 2002/0176378 A1 | 11/2002 | Hamilton et al. | |
| 2002/0198941 A1 | 12/2002 | Gavrilescu et al. | |
| 2003/0006137 A1 | 1/2003 | Wei et al. | |
| 2003/0018830 A1 | 1/2003 | Chen et al. | |
| 2003/0026426 A1 | 2/2003 | Wright et al. | |
| 2003/0046366 A1 | 3/2003 | Pardikar et al. | |
| 2003/0051037 A1 | 3/2003 | Sundaram et al. | |
| 2003/0058884 A1 | 3/2003 | Kallner et al. | |
| 2003/0059020 A1 | 3/2003 | Meyerson et al. | |
| 2003/0060188 A1 | 3/2003 | Gidron et al. | |
| 2003/0061317 A1 | 3/2003 | Brown et al. | |
| 2003/0061404 A1 | 3/2003 | Atwal et al. | |
| 2003/0088421 A1 | 5/2003 | Maes et al. | |
| 2003/0103620 A1 | 6/2003 | Brown et al. | |
| 2003/0123640 A1 | 7/2003 | Roelle et al. | |
| 2003/0195990 A1 | 10/2003 | Greenblat | |
| 2003/0196076 A1 | 10/2003 | Zabarski et al. | |
| 2003/0211842 A1 | 11/2003 | Kempf et al. | |
| 2003/0231647 A1 | 12/2003 | Petrovykh | |
| 2004/0011690 A1 | 1/2004 | Marfino et al. | |
| 2004/0044953 A1 | 3/2004 | Watkins et al. | |
| 2004/0052349 A1 | 3/2004 | Creamer et al. | |
| 2004/0071275 A1 | 4/2004 | Bowater et al. | |
| 2004/0101122 A1 | 5/2004 | Da Palma et al. | |
| 2004/0102182 A1 | 5/2004 | Reith et al. | |
| 2004/0165569 A1* | 8/2004 | Sweatman et al. | 370/349 |
| 2004/0172482 A1 | 9/2004 | Weissman et al. | |
| 2004/0205689 A1 | 10/2004 | Ellens et al. | |
| 2004/0213400 A1 | 10/2004 | Golitsin et al. | |
| 2004/0218748 A1 | 11/2004 | Fisher | |
| 2005/0005200 A1 | 1/2005 | Matena et al. | |
| 2005/0010483 A1 | 1/2005 | Ling | |
| 2005/0021626 A1 | 1/2005 | Prajapat et al. | |
| 2005/0025303 A1 | 2/2005 | Hostetler | |
| 2005/0038772 A1 | 2/2005 | Colrain | |
| 2005/0043952 A1 | 2/2005 | Sharma et al. | |
| 2005/0047579 A1 | 3/2005 | Salame | |
| 2005/0091572 A1 | 4/2005 | Gavrilescu et al. | |
| 2005/0125251 A1 | 6/2005 | Berger et al. | |
| 2005/0128961 A1 | 6/2005 | Miloslavsky et al. | |
| 2005/0135578 A1 | 6/2005 | Ress et al. | |
| 2005/0141500 A1 | 6/2005 | Bhandari et al. | |
| 2005/0147088 A1 | 7/2005 | Bao et al. | |
| 2005/0177635 A1 | 8/2005 | Schmidt et al. | |
| 2005/0181835 A1 | 8/2005 | Lau et al. | |
| 2005/0228680 A1 | 10/2005 | Malik | |
| 2005/0238153 A1 | 10/2005 | Chevalier | |
| 2005/0240659 A1 | 10/2005 | Taylor | |
| 2005/0243977 A1 | 11/2005 | Creamer et al. | |
| 2005/0246176 A1 | 11/2005 | Creamer et al. | |
| 2006/0008073 A1 | 1/2006 | Yoshizawa et al. | |
| 2006/0015467 A1 | 1/2006 | Morken et al. | |
| 2006/0047666 A1 | 3/2006 | Bedi et al. | |
| 2006/0067506 A1 | 3/2006 | Flockhart et al. | |
| 2006/0129638 A1* | 6/2006 | Deakin | 709/203 |
| 2006/0143007 A1 | 6/2006 | Koh et al. | |
| 2006/0168334 A1 | 7/2006 | Potti et al. | |
| 2006/0203979 A1 | 9/2006 | Jennings | |
| 2006/0209695 A1 | 9/2006 | Archer et al. | |
| 2006/0212865 A1 | 9/2006 | Vincent et al. | |
| 2006/0215824 A1 | 9/2006 | Mitby et al. | |
| 2006/0217823 A1 | 9/2006 | Hussey | |
| 2006/0217978 A1 | 9/2006 | Mitby et al. | |
| 2006/0222166 A1 | 10/2006 | Ramakrishna et al. | |
| 2006/0256816 A1 | 11/2006 | Yarlagadda et al. | |
| 2006/0262915 A1 | 11/2006 | Marascio et al. | |
| 2006/0270386 A1 | 11/2006 | Yu et al. | |
| 2006/0285489 A1 | 12/2006 | Francisco et al. | |
| 2007/0002744 A1 | 1/2007 | Mewhinney et al. | |
| 2007/0036143 A1 | 2/2007 | Alt et al. | |
| 2007/0050306 A1 | 3/2007 | McQueen | |
| 2007/0070906 A1 | 3/2007 | Thakur | |
| 2007/0070980 A1 | 3/2007 | Phelps et al. | |
| 2007/0071223 A1 | 3/2007 | Lee et al. | |
| 2007/0074174 A1 | 3/2007 | Thornton | |
| 2007/0121651 A1 | 5/2007 | Casey et al. | |
| 2007/0127691 A1 | 6/2007 | Lert | |
| 2007/0127703 A1 | 6/2007 | Siminoff | |
| 2007/0130260 A1 | 6/2007 | Weintraub et al. | |
| 2007/0133771 A1 | 6/2007 | Stifelman et al. | |
| 2007/0153711 A1 | 7/2007 | Dykas et al. | |
| 2007/0167170 A1 | 7/2007 | Fitchett et al. | |
| 2007/0192629 A1 | 8/2007 | Saito | |
| 2007/0208862 A1 | 9/2007 | Fox et al. | |
| 2007/0242626 A1 | 10/2007 | Altberg et al. | |
| 2007/0265073 A1 | 11/2007 | Novi et al. | |
| 2007/0286180 A1 | 12/2007 | Marquette et al. | |
| 2007/0291905 A1 | 12/2007 | Halliday et al. | |
| 2007/0293200 A1 | 12/2007 | Roundtree et al. | |
| 2007/0295803 A1 | 12/2007 | Levine et al. | |
| 2008/0005275 A1 | 1/2008 | Overton et al. | |
| 2008/0025320 A1 | 1/2008 | Bangalore et al. | |
| 2008/0037715 A1 | 2/2008 | Prozeniuk et al. | |
| 2008/0037746 A1 | 2/2008 | Dufrene et al. | |
| 2008/0040484 A1 | 2/2008 | Yardley | |
| 2008/0052395 A1 | 2/2008 | Wright et al. | |
| 2008/0091843 A1 | 4/2008 | Kulkarni | |
| 2008/0101571 A1 | 5/2008 | Harlow et al. | |
| 2008/0104348 A1 | 5/2008 | Kabzinski et al. | |
| 2008/0134049 A1 | 6/2008 | Gupta et al. | |
| 2008/0139166 A1 | 6/2008 | Agarwal et al. | |
| 2008/0146268 A1 | 6/2008 | Gandhi et al. | |
| 2008/0152101 A1 | 6/2008 | Griggs | |
| 2008/0154601 A1 | 6/2008 | Stifelman et al. | |
| 2008/0155029 A1* | 6/2008 | Helbling et al. | 709/206 |
| 2008/0162482 A1 | 7/2008 | Ahern et al. | |
| 2008/0165708 A1 | 7/2008 | Moore et al. | |
| 2008/0177883 A1 | 7/2008 | Hanai et al. | |
| 2008/0209050 A1 | 8/2008 | Li | |
| 2008/0222656 A1 | 9/2008 | Lyman | |
| 2008/0232574 A1 | 9/2008 | Baluja et al. | |
| 2008/0235230 A1 | 9/2008 | Maes | |
| 2008/0256224 A1 | 10/2008 | Kaji et al. | |
| 2008/0275741 A1 | 11/2008 | Loeffen | |
| 2008/0310599 A1 | 12/2008 | Purnadi et al. | |
| 2008/0313318 A1 | 12/2008 | Vermeulen et al. | |
| 2008/0316931 A1 | 12/2008 | Qiu et al. | |
| 2008/0317222 A1 | 12/2008 | Griggs et al. | |

(56) References Cited

U.S. PATENT DOCUMENTS

| | | |
|---|---|---|
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0232289 A1 | 9/2009 | Drucker et al. |
| 2009/0235349 A1 | 9/2009 | Lai et al. |
| 2009/0252159 A1 | 10/2009 | Lawson et al. |
| 2009/0276771 A1 | 11/2009 | Nickolov et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0037204 A1 | 2/2010 | Lin et al. |
| 2010/0070424 A1 | 3/2010 | Monk |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0167689 A1* | 7/2010 | Sepehri-Nik et al. ......... 455/405 |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0251340 A1 | 9/2010 | Martin et al. |
| 2010/0281108 A1 | 11/2010 | Cohen |
| 2010/0291910 A1 | 11/2010 | Sanding et al. |
| 2011/0029882 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0265172 A1 | 10/2011 | Sharma et al. |
| 2011/0267985 A1 | 11/2011 | Wilkinson et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0320449 A1* | 12/2011 | Gudlavenkatasiva ......... 707/737 |
| 2011/0320550 A1 | 12/2011 | Lawson et al. |
| 2012/0000903 A1 | 1/2012 | Baarman et al. |
| 2012/0017222 A1 | 1/2012 | May |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1* | 3/2012 | Lieberman ............ G06Q 30/02 705/14.45 |
| 2012/0079066 A1 | 3/2012 | Li et al. |
| 2012/0110564 A1 | 5/2012 | Ran et al. |
| 2012/0114112 A1 | 5/2012 | Rauschenberger et al. |
| 2012/0149404 A1* | 6/2012 | Beattie et al. ................. 455/466 |
| 2012/0173610 A1 | 7/2012 | Bleau et al. |
| 2012/0174095 A1 | 7/2012 | Natchadalingam et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0226579 A1 | 9/2012 | Ha et al. |
| 2012/0239757 A1 | 9/2012 | Firstenberg et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2013/0029629 A1 | 1/2013 | Lindholm et al. |
| 2013/0031158 A1 | 1/2013 | Salsburg |
| 2013/0054684 A1 | 2/2013 | Brazier et al. |
| 2013/0058262 A1 | 3/2013 | Parreira |
| 2013/0067448 A1 | 3/2013 | Sannidhanam et al. |
| 2013/0156024 A1 | 6/2013 | Burg |
| 2013/0212603 A1 | 8/2013 | Cooke et al. |
| 2013/0244632 A1 | 9/2013 | Spence et al. |
| 2014/0064467 A1 | 3/2014 | Lawson et al. |
| 2014/0105372 A1 | 4/2014 | Nowack et al. |
| 2014/0106704 A1 | 4/2014 | Cooke et al. |
| 2014/0123187 A1 | 5/2014 | Reisman |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0274086 A1 | 9/2014 | Boerjesson et al. |
| 2014/0282473 A1 | 9/2014 | Saraf et al. |
| 2014/0355600 A1 | 12/2014 | Lawson et al. |
| 2015/0004932 A1 | 1/2015 | Kim et al. |
| 2015/0004933 A1 | 1/2015 | Kim et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 02087804 | 11/2002 |
| WO | 2006037492 A | 4/2006 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

* cited by examiner

SYSTEM AND METHOD FOR MANAGING TELEPHONY ENDPOINT INVENTORY

CROSS-REFERENCE TO RELATED APPLICATIONS

This application claims the benefit of U.S. Provisional Application Ser. No. 61/836,927 filed on 19 Jun. 2013, which is incorporated in its entirety by this reference.

TECHNICAL FIELD

This invention relates generally to the telephony endpoint field, and more specifically to a new and useful system and method for managing telephony endpoint inventory in the telephony endpoint field.

BACKGROUND

In recent years, telephony communication platforms and IP based phone services, applications, and platforms have partly caused more volatility in the demand of phone numbers and short codes used as telephony endpoints. Similarly, more of the world is becoming connected and moving from shared home phones to individual mobile phones and sometimes multiple numbers managed through various phone applications. Phone numbers have become more disposable, and the demand of phone numbers has increased while the demand fluctuations have more real-time urgency. While previously a user would often hold onto a phone number for a long time, now a phone number may only have a customer lifetime of a month, day, an hour or even a single use. Further complicating phone number management is that there is no central registrar of phone numbers, and various carriers and entities hold and distribute phone numbers. The transfer of such numbers from carriers can at times be slow and unable to keep up with real-time demand requirements. Thus, there is a need in the field to create a new and useful system and method for managing telephony endpoint inventory. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Managing Telephony Endpoint Inventory

Figure 1:
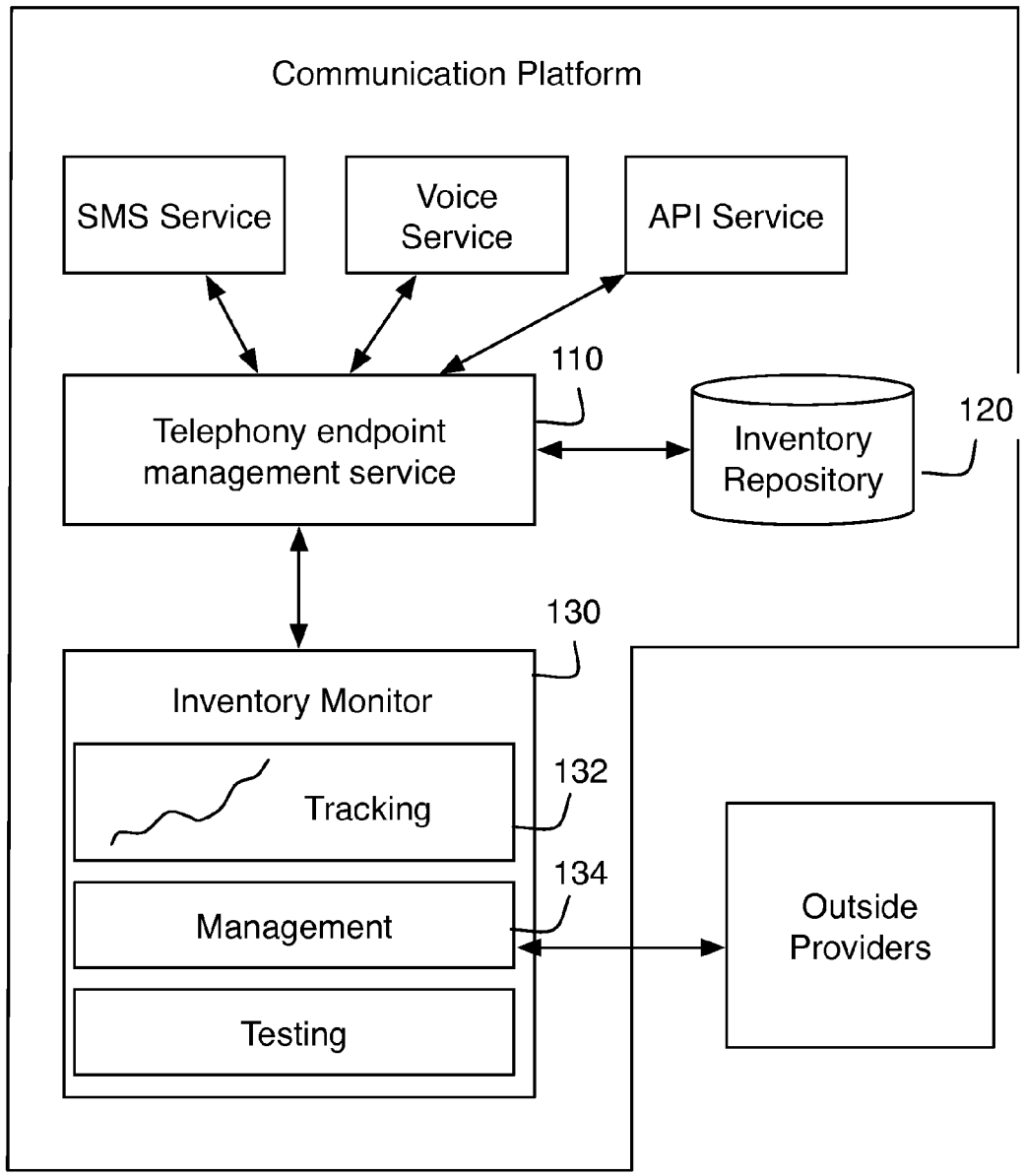
FIG. 1 is a schematic representation of a system of a preferred embodiment.

As shown in FIG. 1, a system for managing telephony endpoint inventory of a preferred embodiment can include a telephony endpoint management service 110 interfacing between services of a communication platform and a telephony endpoint repository 120 and an inventory monitor 130. The system functions to enable telephony endpoint management, more specifically maintaining an endpoint repository with desired characteristics and performance quality. A telephony endpoint is preferably an address to which PSTN and telephony communication can be directed. A telephony endpoint can be a phone number, a short code, toll phone number, or any suitable address type. The telephony endpoint may alternatively be any suitable form of communication endpoint, which can be any communication addressing mechanism. The communication endpoints may be offered in a limited fashion, which will commonly lead to re-use and transfer of endpoints between entities. The transfer of endpoints may result in "dirty" endpoints, endpoints with out of date or false associations. Additionally, the endpoints are preferably served and provided through outside sources such as a telephone carrier, or some domain/address provider.

The system is preferably incorporated into a communication platform that provides capabilities of purchasing, renting, or being assigned a telephony endpoint for customer use. For example, the communication platform is preferably a multi-tenant communication application platform where users can set up various applications for facilitating communications to assigned phone numbers. The communication platform is preferably substantially similar to the one described in U.S. Pat. No. 8,306,021, issued 6 Nov. 2012, which is hereby incorporated herein in its entirety by this reference. The communication platform can alternatively have any suitable architecture or functionality. In one variation, the system may be a stand-alone telephony endpoint registrar/service used by multiple outside entities. The system is preferably integrated into the operation of the communication platform such that telephony endpoint inventory can be updated according to endpoint availability and telephony endpoint usage. Requests for a new phone number can have varying forms of desired address patterns and endpoint capabilities. For example, the area code, last four digits, country code, and capabilities are all dimensions, which may be important to various users. The system can automatically track and monitor telephony endpoint inventory across several dimensions so that a pool of desirable telephony endpoints is ready for delivery to a customer.

The telephony endpoint management service 110 functions to provide a service interface for interacting with telephony endpoints. The telephony endpoint management service 110 is preferably an intermediary component between the endpoint repository and components of a communication platform. The telephony endpoint management service 110 preferably includes an application programming interface (API) that can be used by other components for interacting with records of telephony endpoints. The API acts as an intermediary abstraction layer between stored numbers and various services of the communication platform. By implementing the telephony endpoint management service 110 in front of the endpoint repository, the components of the communication platform are independent of the inner functionality of the endpoints. Any request to inspect, request, create, port, delete, and/or interact with an endpoint preferably passes through the telephony endpoint management service 110. This visibility into interactions with the telephony endpoints is preferably exploited to enable the inventory monitor sub-system 130 to track and respond to inventory demand.

The API is preferably a RESTful API but may alternatively be any suitable API such as SOAP. The API can work according to an HTTP request and response model. HTTP requests (or any suitable application layer communication) to the telephony endpoint management service 110 preferably observes the principles of a RESTful design. RESTful is understood in this document to describe a Representational State Transfer architecture as is known in the art. The RESTful HTTP requests are preferably stateless, thus each message communicated from the call router to the application server preferably contains all necessary information for operation of the application server and response generation of the application server. The components of the communication platform and/or the telephony endpoint management service 110 preferably do not need to remember or store previous communications to be aware of the state. The API may be an internal API used by services within the communication platform of the system, but the API may alternatively be at least partially public, wherein external entities can access portions of the API.

The API may include API calls to inspect properties of a telephony endpoint. The API may include API calls to request a telephony endpoint to be used as a customer's terminating endpoint. For example, an API request may initiate a purchase or acquisition of an endpoint for use by an account. Preferably, the communication platform is a multitenant platform that uses an account system to segment functionality. An account can have a number of assigned telephony endpoints. A request can be made to add a new phone number to an account. In some variations, the request may include desired properties of the telephony endpoint. The desired telephony endpoint may be specified by area code, country code, functionality (e.g., SMS capable), type (e.g., toll free, short code, etc.), address patterns (e.g., vanity properties like ending in all zeros), cost, quality (e.g., high voice or messaging quality), and/or any suitable property of a telephony endpoint. Similarly, the API may include API calls to remove an endpoint. An API request is preferably submitted to disassociate an endpoint from an account or customer. Removing an endpoint may return the endpoint to a pool of available endpoints or alternatively a pool of endpoints to test before making it available. Other actions can include porting of an endpoint either into the system (e.g., for an existing user phone number) or out of the system (e.g., transfer management of the endpoint to another system/carrier). In one variation, a record of a telephony endpoint may include application-mapping information that is used during use of the telephony endpoint. Thus, during normal use of the telephony endpoint by an account, the API may be used to access application information such as a URI for a telephony application or application instructions. Accordingly, the telephony endpoint management service 110 can have visibility into usage of the endpoints, which may be used by the inventory monitor sub-system 130. In another variation, the API can include feedback calls to report quality issues, either good performance or bad performance. The inventory monitor sub-system 130 can be notified of any of the above inventory related actions.

Figure 2:
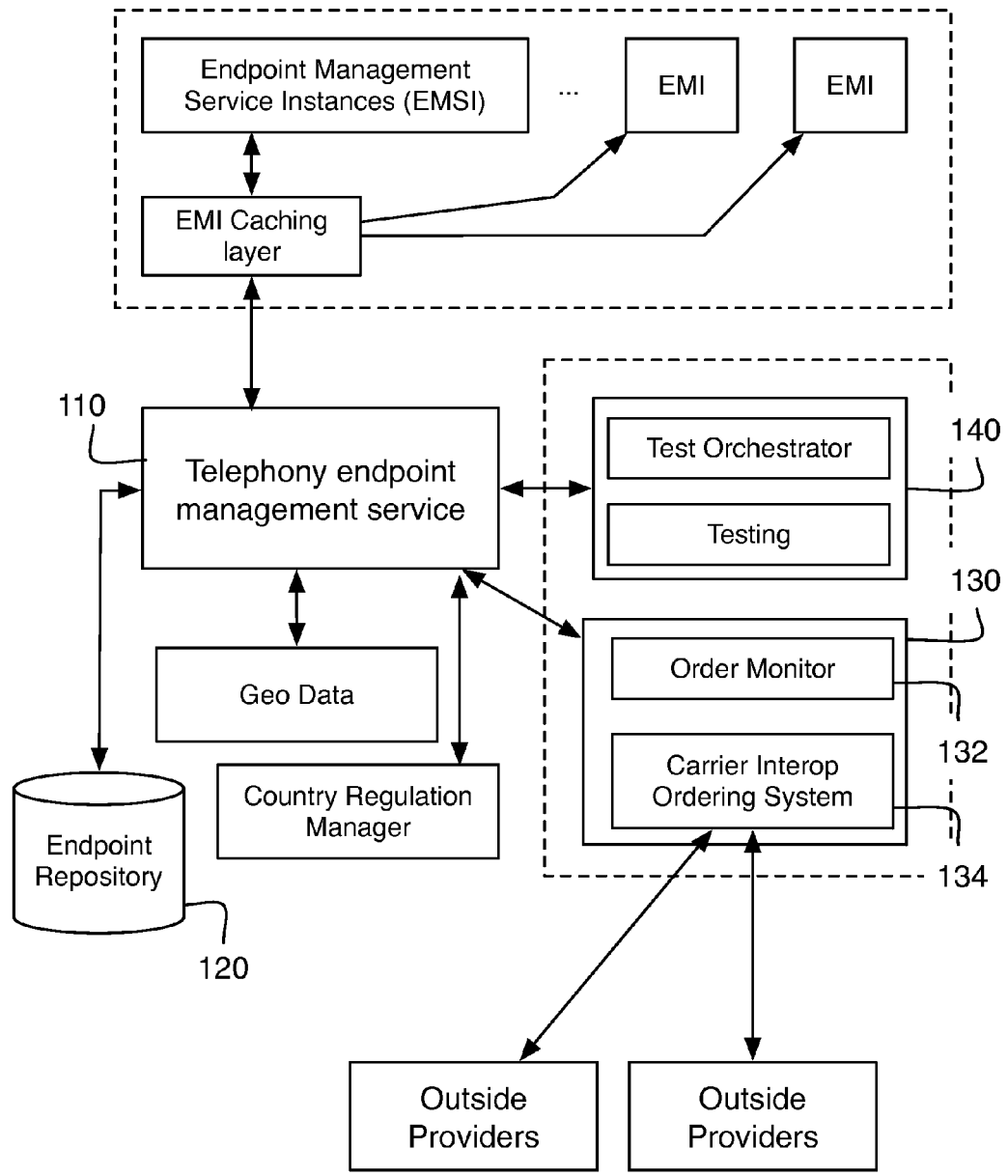
FIG. 2 is a schematic representation of a variation of a system of a preferred embodiment.

As shown in FIG. 2, the system can additionally include a set of distributed set of endpoint management service instances. The distributed set of service instances function to provide scalability and regional availability of API access into the endpoint information and management.

The telephony endpoint repository 120 functions to store endpoint data. A telephony endpoint preferably has a record stored in a database or distributed through several database tables or other suitable data models. An endpoint record may include various properties of an endpoint such as a unique identifier of the telephony endpoint, the direct inbound address (e.g., the phone number of short code), origin properties, geolocation information, a cleanliness/quality score, capability properties (e.g., SMS, MMS, Fax, etc.), status (e.g., mobile, landline, client application, tool free, business, etc.), and/or other suitable properties of a telephony endpoint. Origin properties can includes NPs (e.g., area code), NXX (e.g., three digit vanity digits of a number), ISO country codes, region properties and/or any suitable origin properties. Endpoints may additionally have different allocation statuses. An endpoint may be allocated, available, or in an evaluation status. An allocated endpoint is preferably an endpoint in use by some entity. An allocated endpoint is associated or otherwise mapped to an entity. The entity is preferably an account in the system, but may alternatively be a device or an external routing destination. An available endpoint is an endpoint that is available for allocation. The available endpoints are preferably not in active use, and may be acquired by a user. An endpoint in an evaluation stage may be undergoing a period of testing to ensure quality standards. An evaluation stage may additionally include a rejected state where the endpoint is deemed unusable. Such endpoints are preferably returned or removed from the system during endpoint transactions with an endpoint source.

Additionally, the telephony endpoint repository 120 may accumulate and track information for endpoints managed outside of the communication platform. Communications made through the communication platform may often include one endpoint managed by the system and an external endpoint. An informational database of external endpoints can be built through use of the system and/or through access to external data sources. The external endpoint information may be used when acquiring and evaluating newly obtained endpoints.

The inventory monitor 130 functions to track, analyze, and manage inventory requirements across multiple categories. The inventory monitor 130 is preferably communicatively coupled to the telephony endpoint management service no. The inventory monitor 130 preferably receives updates on changes made to the inventory repository 120 and/or usage of the various telephony endpoints in the system. The inventory monitor 130 includes a tracking component 132 that facilitates tracking the inventory across various dimensions such as country code, area code, capabilities, vanity features, and other suitable characteristics. In response to the monitored status of the inventory, the inventory monitor 130 can initiate communication with telephony endpoint providers. The inventory monitor 130 can be responsive to changes in quality of one or more endpoints in the repository and to changes in availability or quantity of endpoints aligned to particular endpoint categories. The inventory monitor 130 preferably includes an endpoint order system 134

The tracking component 132 of the inventory monitor 130 preferably updates inventory status according to new endpoint allocation, removal of endpoints, and the use of telephony endpoints. The tracking component 132 preferably works with a number keeping unit to sub-divide, segment, and/or categorize telephony endpoints into classification groups. The number keeping unit preferably maps a telephony endpoint to an endpoint identity. For example, a telephony endpoint identity may just be the area code of a telephone number. More preferably, the number keeping unit maps a telephony endpoint to multiple classifications. The different classifications of telephony numbers preferably overlap—a telephony endpoint can be a member of two groups. The tracking component preferably stores, queries, or calculates inventory analytics for individual classifications. In this way, the inventory along different dimensions can be tracked and maintained. For example, the number of mobile phone numbers, the phone numbers for a particular area code, and the number of mobile phone numbers for the particular area code may all be dimensions in which inventory is tracked and monitored.

The endpoint order system 134 functions to interface and facilitate the transfer of endpoints with at least one endpoint provider. Telephony carriers/network providers often hold a large number of telephony endpoints. They are preferably used as the source of ordered telephony endpoints, but the outside source of the telephony endpoints can be any suitable party. The endpoint order system 134 may directly interface with endpoint providers to submit orders. Alternatively orders or order specifications may be generated and provided to any suitable party.

The system can additionally include a testing component 140, which functions to process telephony endpoints. The testing component 140 can perform initial testing on obtained telephony endpoints prior to fully incorporating the telephony endpoint into the system for use. The testing component 140 may additionally or alternatively be used in periodic evaluation of endpoints already integrated in the system. For example, endpoints that are deallocated for a particular account may be tested before offering to other customers. When a telephony endpoint is moved or ported to the system, the properties of the telephony endpoint may not be known. Often, a provider will deliver telephony endpoints in bulk (e.g., a block of 1000 numbers), wherein several hundred telephony endpoints are transferred to the system. When more telephony endpoint inventory is required, it is often for a target classification of telephony endpoints. As one stage of the testing component, the classification of the obtained telephony endpoints is verified to comply with the desired classification. If an obtained telephony endpoint is not of a desired classification, then the particular telephony endpoint may be returned or exchanged with the provider (e.g., through the endpoint order system 134). As another stage of the testing component 140, the functionality of obtained telephony endpoints can be verified. Testing scripts and testing devices can be coordinated to run various test scenarios on a telephony endpoint. Tested capabilities can include capability of receiving calls, making calls, receiving messages, routing to client applications, and/or performing other suitable tasks. Communication testing may additionally be performed between different geographic regions and/or between different types of devices (e.g., PSTN to SIP device). If an obtained telephony endpoint fails to pass a test, the telephony endpoint may be returned to the provider (depending on the desired capabilities of the telephony endpoint). The functionality testing may measure success and failure of particular capabilities and/or quality measurements. As another stage of the testing component 140, a cleanliness score of a telephony endpoint can be evaluated. The cleanliness score is a measure of undesired communications that are received at the number. An undesired communication can be a call or message that results from a caller entering the wrong phone number, a call or message that was intended to reach a previous owner of the telephony endpoint, unsolicited calls or messages (e.g., telemarketers), spam text messages, or any suitable undesired communication. The cleanliness stage preferably places the telephony endpoints in temporary quarantine state where incoming communication is monitored for a set duration of time. If no incoming calls or messages are transmitted to the telephony endpoint, then the number is considered clean and can be confidently used and distributed to users of the system.

The system may additionally include any suitable sub-system to supplement the endpoint inventory information such as an endpoint information database, a geo data system (which may provide mapping between geographic regions and endpoints), a country regulation manager (which may provide information on regional regulations relating to the endpoints), and/or any endpoint monitoring or information suitable sub-system.

2. Method for Managing Telephony Endpoint Inventory

Figure 3:
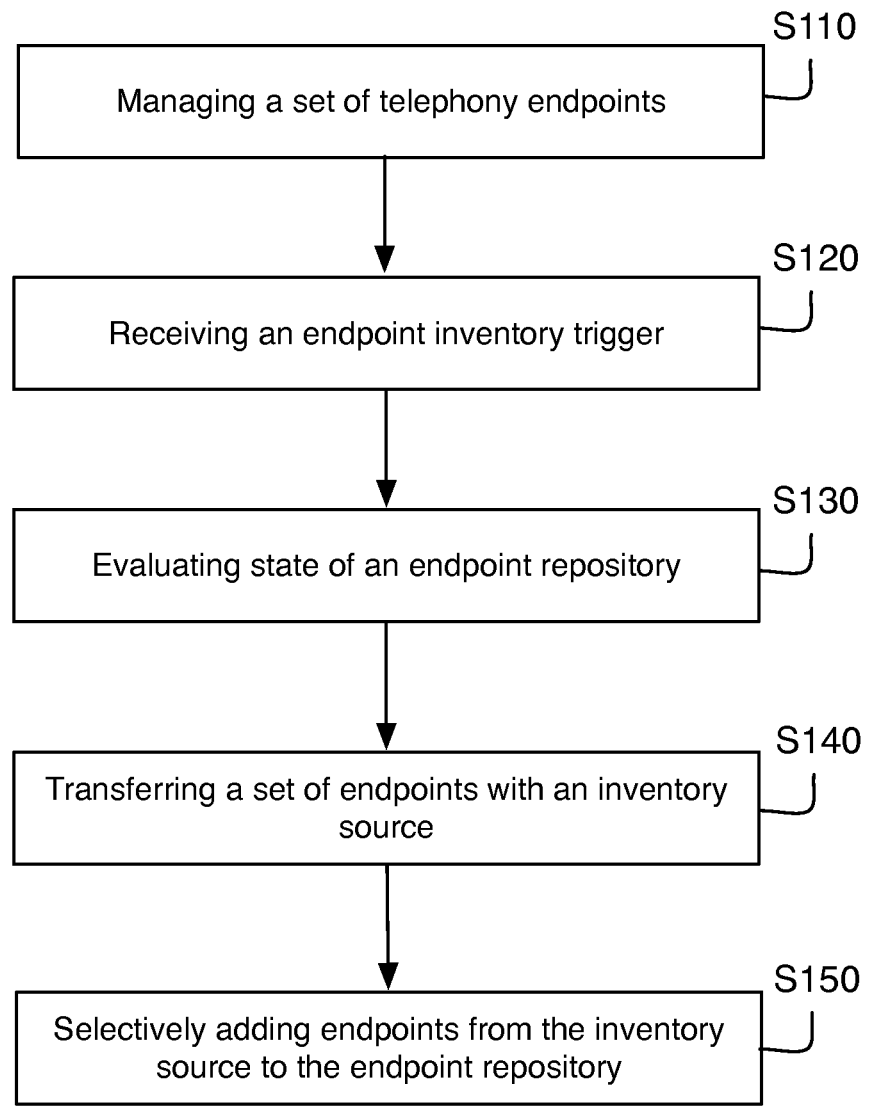
FIG. 3 is a flow diagram representation of a method of a preferred embodiment.
Figure 4:
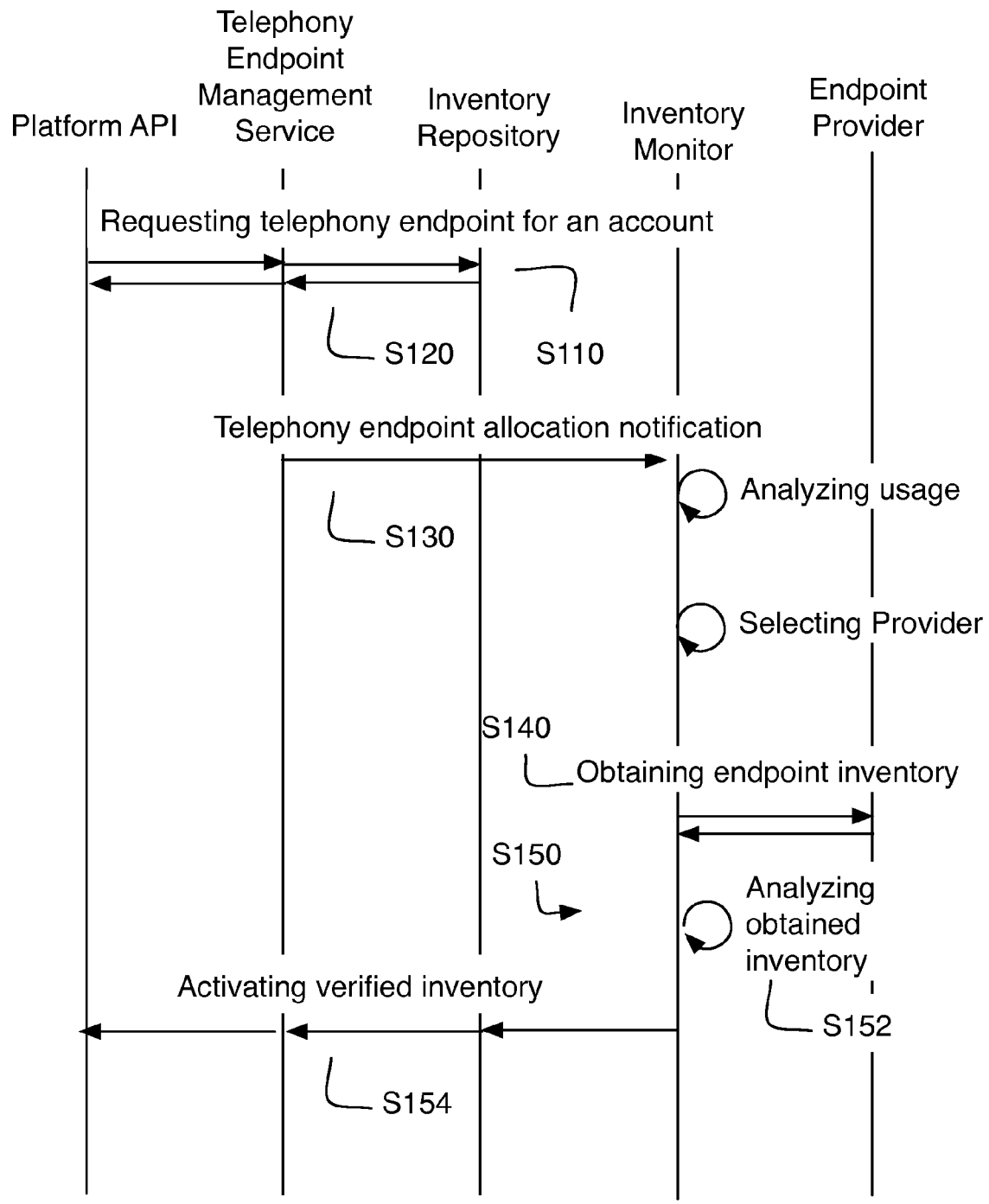
FIG. 4 is a communication flow diagram of an exemplary instance of a method of a preferred embodiment.

As shown in FIG. 3, a method for managing telephony endpoint inventory of a preferred embodiment can include managing a set of telephony endpoints S110, evaluating state of an endpoint repository S130, transferring a set of endpoints with an inventory source S140, and selectively adding endpoints from the inventory source to the endpoint repository S150. The method functions to maintain an inventory of phone numbers that is balanced based on the usage demand. The method can additionally include receiving an endpoint inventory trigger S120, which functions to automatically invoke inventory management. As shown in FIG. 4, the method is preferably applied to maintain a pool of endpoints with quality standards suitable for distribution. The method preferably accounts for complexities unique to telephony endpoint management such as interfacing with supplying entities of telephony endpoints and the accounting for the unknown condition of received inventory due to the varied history of telephony endpoints.

Telephony endpoints are preferably phone numbers, shortcodes, toll-free numbers, and/or other suitable telephony communication addresses. In one variation, the telephony endpoints can be SIP addresses, and/or proprietary endpoints. The method is preferably implemented within a communication platform, carrier, or other infrastructure that holds, supplies, and/or works with a large number of telephony endpoints. Distributing telephony endpoints preferably includes allocating telephony endpoints for usage by end-customers user of the communication platform, but can alternatively include exporting/selling the endpoints out of the platform. In another implementation, the method is executed within a telephony endpoint management service that acts as a warehousing/registrar for telephony endpoints. The telephony endpoints are preferably a diverse collection from various countries, different regions, enabled with different features (e.g., voice enabled, SMS enabled, etc.), and/or having different properties (e.g., 800 number, particular area code, NPA-NXX pattern, particular number pattern, and the like). The repository of telephony endpoints may alternatively target a specified subset of telephony endpoints. The method preferably enables inventory to be maintained to satisfy the various patterns of telephony endpoint demand.

Block S110, which includes managing a set of telephony endpoints, functions to provide utility for the telephony endpoints within a platform. The set of telephony endpoints managed by the communication platform preferably means that external telephony and communication systems will direct communication to the communication platform for the endpoints in the set of telephony endpoints. Furthermore, the communication platform can make outgoing communications from an endpoint from the set of endpoints.

The telephony endpoints can preferably be in an allocated state or an unallocated state. An endpoint in an allocated state is preferably mapped to a user, account, or other suitable entity in the communication platform. The allocated telephony endpoints are assigned to or "owned" by a user account. The user account can then associate the telephony endpoint with an application, a routing configuration, and/or used in any suitable manner. A user account can make outgoing calls using an allocated endpoint, and communications directed at that endpoint can be received or otherwise trigger some event (e.g., execution of a telephony application). The communication platform is preferably a multitenant platform, and accordingly must manage a wide variety of telephony endpoint allocations. The various users will have different desires and requirements for the properties and characteristics of the specific endpoint or endpoints allocated to their user accounts. In some cases, a user may request an endpoint managed outside of the communication platform to be ported into the communication platform (e.g., changing routing of outside communication systems).

The unallocated telephony endpoints are preferably endpoints that are available to be allocated. Users can preferably query the set of unallocated telephony endpoints to select, purchase, rent, or otherwise allocated the telephony endpoint to their accounts. When searching for an endpoint, a user may be able to specify specific characteristics of the endpoint such as patterns in the number, geographic associations, communication capability, price, quality, and/or other suitable properties. The unallocated telephony endpoints are preferably managed through the method so as to provide a desirable pool of telephony endpoints. As described below, the managed telephony endpoints will be classified for different dimensions or properties. At least the inventory of unallocated endpoints is maintained to satisfy inventory target conditions. The unallocated endpoints may additionally be in an available and unavailable state. Available endpoints are in a state that can be allocated if or when selected. Unavailable endpoints are endpoints that are managed by the communication platform but may not be suitable or fully enrolled for allocation. The unavailable endpoints are preferably not offered in an endpoint marketplace. For example, an unavailable unallocated endpoint may go through various quality testing processes. One such quality testing process monitors incoming communications while the endpoint is unallocated to determine the dirtiness of the endpoint. The dirtiness of an endpoint preferably describes the level of mis-dialed or mis-directed (e.g., attempting to reach an old owner of the endpoint) communication.

Figure 5:
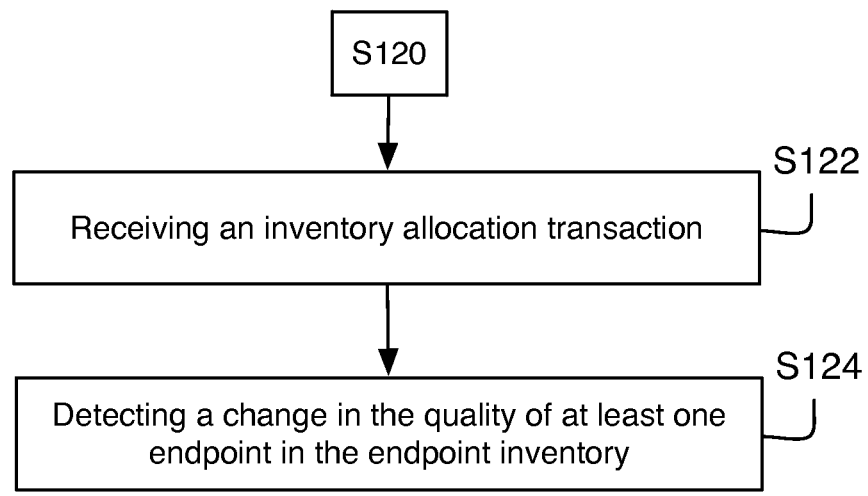
FIG. 5 is flow diagram of variations of receiving an endpoint inventory trigger.

Block S120, which includes receiving an endpoint inventory trigger, functions to intercept actions within a platform that impact inventory usage. Endpoint inventory triggers can include receiving an inventory allocation transaction S122 and/or detecting a change in the quality of at least one endpoint in the endpoint inventory S124 as shown in FIG. 5. An endpoint inventory trigger may alternatively be a scheduled event. The scheduled event is preferably a periodic time based event that triggers an inventory check and updating. For example, the communication platform may check inventory daily, weekly, or monthly. Scheduled events may alternatively be based on traffic within the communication platform, a count of a particular events, or any suitable communication platform metric. An endpoint inventory trigger may alternatively be manually triggered, wherein an administrator selects to perform an inventory check and update.

Receiving an inventory allocation transaction S122 functions to respond to changes in endpoint status. A telephony endpoint management service is preferably an interface through which other services access or interact with telephony endpoints that are currently active or available in the platform. The management service is preferably a RESTful API exposed to internal services of a platform, but may alternatively be directly exposed to external services. The management service is preferably substantially similar to the telephony endpoint management service described above. As an intermediary component between the telephony endpoint repository and other applications, services, or components, the management service can preferably be configured to react and/or trigger actions when the telephony inventory is impacted. In one variation, a sub-set of types of requests is set to induce an inventory management response. In a preferred implementation, types of requests that trigger inventory monitoring include requesting a new endpoint, returning/canceling endpoint usage, searching for a type of telephony endpoint (e.g., searching for endpoints with a particular area code), porting a telephony endpoint, reserving/requesting a telephony endpoint, reporting quality/issues with a telephony endpoint, exchanging a telephony endpoint, and/or any suitable action to impact the telephony endpoint inventory. In some cases, such requests may be for a particular endpoint, but in other cases, such endpoint inventory requests specify characteristics or traits of an endpoint (e.g., searching for an endpoint with particular properties).

As an exemplary scenario, an outside application may need a new phone number. The outside application makes an API request (or alternatively completes an order online). This request is delivered to the associated communication platform, where a public API service receives the request and then transmits an internal API request to the telephony endpoint management service. The telephony endpoint management service detects that the request changes the amount of available inventory and messages the inventory monitor while processing the request and allocating one of the existing telephony endpoints to the outside application. The architecture of an intermediary telephony endpoint management service abstracts the monitoring of inventory so that inventory management can transparently occur without impacting operation of other services.

Since the telephony endpoint management service is the interface for querying telephony endpoint properties, the telephony endpoint management service can additionally review requests that query the endpoint for general usage. Endpoint usage can include a number of incoming calls, number of outgoing calls, number of messages sent, number of messages received, properties of calls and messages (e.g., where is the other leg of the call, what carrier is used), quality of communication, and other usage based parameters. Such usage may impact inventory predictions, such as predicting if a customer will return a telephony endpoint soon. Numbers that receive high usage and have high quality calls may be considered more static/long-term numbers, and the inventory monitor can account for such inventory stickiness when predicting supply. A telephony endpoint that is rarely used and/or suffers from quality issues may be returned or removed from an account soon and return to available inventory. A telephony endpoint with this usage pattern may be considered potentially available inventory in the future. For example, in one preferred implementation, when a phone call is received by the communication platform, the destination endpoint may be queried through the telephony endpoint management service to identity if an application exists for the phone number, if the call should be routed internally, if the call should be forwarded to another number, or how the call to the number should be handled.

Detecting a change in the quality of at least one endpoint in the endpoint inventory S124 functions to trigger an inventory update when one or more endpoints have changes in quality. The change in quality can occur to endpoints with any suitable status such as allocated, unallocated, available, or unavailable/evaluating. A quality feedback API may facilitate receiving quality feedback updates in response to communications with the endpoint. Similarly, communication monitoring and analytics could similarly provide data on communication quality of an endpoint. In some cases, endpoint registration with carriers or other entities may result in poor performance endpoints, such monitoring could detect when an endpoint enters such a state. Detecting a change in quality can additionally or alternatively include periodically executing automated quality testing. The quality testing may be substantially similar to the endpoint testing described below. The method preferably maintains a set of endpoints with some quality assurances for the endpoint. If the availability of quality endpoints in a particular category changes such quality monitoring can detect the event and respond.

Figure 6:
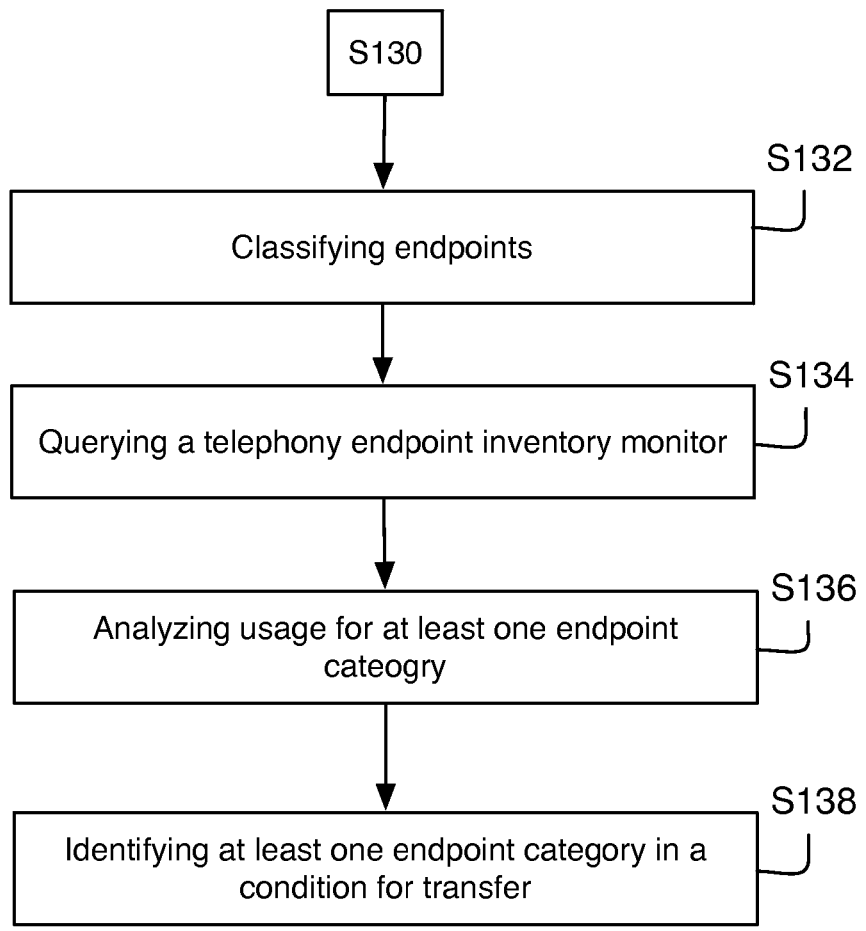
FIG. 6 is a flow diagram of variations of evaluating state of an endpoint repository

Block S130, which includes evaluating state of an endpoint repository, functions to determine how changes in endpoint inventory are impacted. The evaluation of the state of an endpoint repository may be in performed upon receiving an endpoint inventory trigger, but may alternatively be periodically performed, performed in response to a system request, or triggered for any suitable reason. The evaluation of the state of the endpoint repository preferably transforms endpoint interactions described for Block S120 into recommended inventory actions. The evaluation can identify patterns in endpoints that should be acquired or released and optionally predict upcoming endpoint trends. Demand for endpoints is often not uniform across all endpoint characteristics. Block S130 preferably includes classifying endpoints S132, querying a telephony endpoint inventory monitor S134 and analyzing usage for at least one endpoint category S136 as shown in FIG. 6.

Block S132, which includes classifying endpoints, functions to determine a set of tags, labels, or properties for each endpoint. A plurality of classifiers is preferably identified for each endpoint but alternatively a single classifier may be used. Additionally each endpoint may have a different number of classifiers. The classifiers are preferably organized into different classifier types, where each classifier type is for a particular category or dimension. The different types of classifiers can include classifiers for inherent properties of the endpoint and for measured properties. Some classifiers, such as the inherent property classifiers, are immutable. Other forms of classifiers, such as a quality classifier or capability classifier, may change over time. The classifiers can include country classifiers, region classifiers, communication capability classifiers (e.g., mobile capability, voice enabled, SMS enabled, MMS enabled, etc.), number type classifier (e.g., normal number, short code, 800 number, etc.) area code, NPA-NXX pattern (i.e., a numbering plan area code classifier), number patterns (e.g., XXX-XXX-1234), quality classifiers, and/or any suitable classifier type. The quality classifiers can be based on results from endpoint quality results from quality tests described below. The classification process is preferably pre-calculated and/or periodically updated, but the classifiers of the endpoints may alternatively be generated on-demand.

Blocks S134 and S136 function to evaluate endpoint inventory across a set of endpoint classification groupings and to detect at least one classification grouping that, based in part on the allocated and unallocated state of corresponding endpoints, satisfies an inventory update condition.

Block S134, which includes querying an inventory monitor, which functions to check inventory levels and account for changes in inventory. Querying the inventory monitory preferably includes performing a set of queries that use the classifiers in a classification grouping. The classification grouping preferably uses logic and other rule based definitions to define a queried set of endpoints that satisfy that classification grouping. The inventory monitor can be database. The results of the query can be inventory count, change in inventory, or any suitable metric or metrics. The management service preferably transmits a message to the inventory monitor upon detection of a triggerable inventory event. Inventory updates may alternatively be batched and sent in bulk. Triggerable inventory events preferably include allocating or removing a telephony endpoint for a user of the communication platform. Other triggerable events may additionally be used such as telephony usage and quality report events.

In one variation, the query can target a particular change in the inventory. For example, if one endpoint with a classifier identifying it as a number from area code 415 is allocated, then the inventory for area code 415 may be evaluated. The message preferably communicates the particular endpoint and the inventory action. Inventory actions may include allocating the particular endpoint. In other words, the endpoint is removed from available inventory to allocated inventory. Another inventory action may include setting the particular endpoint to available. Users of a platform may cancel their account, which can return telephony endpoints to an available state. Users may also individually cancel an endpoint, or telephony endpoint allocation may expire. For example, endpoints may expire after an account doesn't use the endpoint for a set duration or if the account becomes inactive. When a telephony endpoint become available, the telephony endpoint may receive analysis as described in Block S150. The inventory actions can additionally include porting of a number, which describes a request to move an endpoint out of the system. Another inventory action may be changes to inventory quality, which as mentioned above, can impact predictions on the duration of usage of the endpoint.

Figure 9:
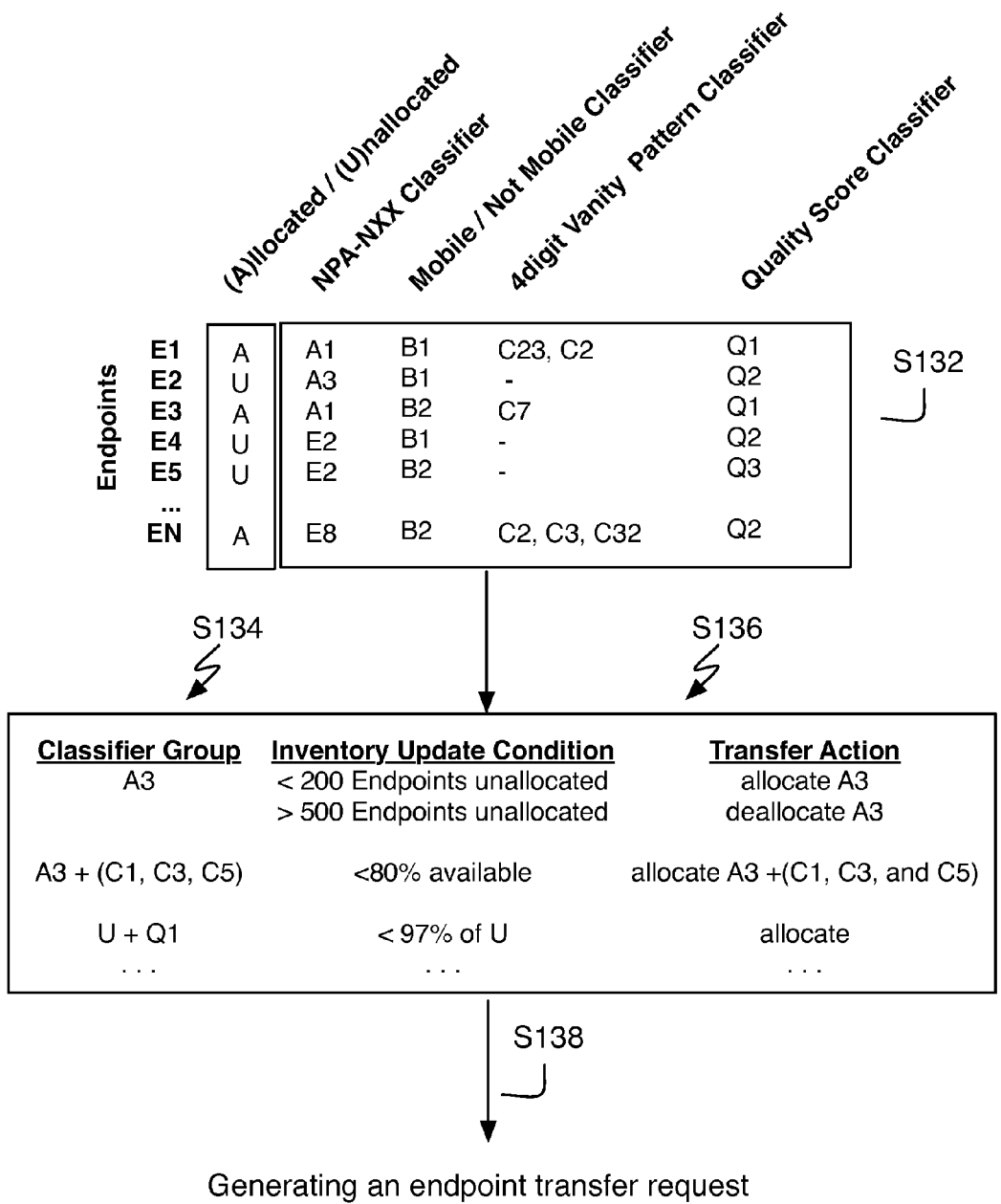
FIG. 9 is a detailed schematic representation of evaluating state of an endpoint repository.

Querying a telephony endpoint inventory monitor preferably includes identifying inventory levels, which functions to segment inventory around the endpoint associated with the trigger. In the general scenario, the inventory is all treated as the same group. There are preferably at least two states of inventory: available unallocated inventory and allocated inventory. Available allocated inventory is inventory not assigned to a customer/user but available to be allocated. Allocated inventory is inventory that is currently maintained by the system and is assigned to at least one account or customer. There can be other inventory states such as an evaluation state, quarantine state, new inventory state, retired inventory, and other suitable states. Demand is often very different for different countries, area codes, and capabilities. The inventory monitor preferably allows inventory to managed based on various classification groupings. As shown in FIG. 9, different patterns in classifiers can be specifically monitored. The way in which the classifiers are monitored may be defined in any suitable manner. A change to a particular telephony endpoint is preferably monitored based on how it impacts the inventory of similar telephony endpoints. In one variation, a number keeping unit preferably facilitates mapping an endpoint to at least one classifier. The classification can further be divided into various classes, categorizations, and segments. Preferably, the telephony endpoint is classified at least by area code or an address prefix. The telephony endpoint may additionally or alternatively be classified by country code, country, region, carrier, functionality (e.g., SMS, MMS, Fax, tool free, etc.), vanity characteristics (first three digits), cleanliness score, quality score, and/or any suitable classification. The number keeping unit preferably maps the endpoint to an endpoint identity or endpoint classification grouping. Then the records for that number identity are queried. In one variation, the identity is a unique endpoint, but the identity may alternatively be a group or classes of endpoints.

In a simple use case, the number identity is just the area code. In another use case, a set of endpoint classifications are identified, and each classification is then monitored to evaluate if inventory for those classifications need to be individually adjusted. The classification of inventory may be dynamic, wherein the collections of inventory are uniquely queried and tallied based on the current endpoint. However, the inventory classifications may alternatively be generalized and static. For example, there may be a classification for each area code, and a record is maintained for each classification within the system.

Evaluation of the inventory for particular endpoint characteristics can include accounting for current inventory counts, which may include the count allocated inventory, count of available inventory, ratio of allocated to available inventory, inventory request rate, and other metrics for one or more endpoint identity characteristics or for the global inventory. Evaluating preferably factors in supply and demand aspects of the endpoint inventory.

Additionally, querying a telephony endpoint inventory monitor preferably includes accounting for endpoint inventory changes, which functions to update tracked metrics of inventory. When a message indicates an inventory change, the inventory accounting for the various classifications changes. Each classification of a telephony endpoint is preferably monitored or accounted for individually. For example, a phone number with a 415 area code and with SMS capabilities may be classified according to both these properties. The inventory for 415 numbers can be maintained and processed separately from the SMS-capability property. In this way, inventory for 415 numbers can satisfy demand and inventory for SMS capable numbers can also satisfy demand. Meta-categories may be combinations of properties. For example, a separate classification for SMS capable 415 numbers may ensure that enough inventory is maintained with both of these properties. Accounting preferably includes incrementing an inventory count when an endpoint is ported or added to the repository of endpoints; changing state between available and in-use when appropriate; decrementing an inventory count when an endpoint is removed or retired. When accounting endpoint inventory, the current tally or count of endpoints is preferably stored. Additionally, historical data of endpoint inventory may be stored, such that changes in inventory can be used to project demand. Usage and quality data may be used to generate predictions on lifespan of individual telephony endpoints in different classification groups.

Block S136, which includes analyzing usage for at least one endpoint classification, functions to detect if action should be taken to adjust inventory. In particular, block S136 includes detecting at least one classification grouping that satisfies an inventory update condition. The inventory update condition is preferably detected based at least in part on the allocated and unallocated state of endpoints that correspond to that classification grouping. The inventory monitor preferably compares the inventory metrics resulting from a classification grouping query to inventory thresholds. The inventory thresholds may be preset for different classifications. The inventory thresholds may additionally automatically adjust based on current and/or past inventory metrics. In one variation, if an inventory metric satisfies an inventory threshold (e.g., available inventory drops below a particular number), then a response is triggered to add or remove inventory. Accordingly, evaluating state of an endpoint repository preferably includes identifying at least one endpoint category in condition for transfer S138. The condition for transfer may be low supply or excess supply, which may each result in obtaining endpoints for that endpoint category or releasing end-points in that endpoint category. Analyzing usage may additionally account for inventory metric history, where slope, acceleration, and other trends and properties are used to predict expected inventory requirements. The analysis may additionally factor in other properties of telephony endpoints other than the total count. As was previously mentioned, quality measurements of an endpoint can be incorporated into the usage analysis. Endpoint quality may be used to predict the lifetime of an in-use endpoint. Alternatively, endpoint quality may be used as a filter of endpoints such that the threshold is enforced upon only high quality endpoints. Analysis of the usage can trigger a response. Primarily, the inventory monitor is configured for managing inventory such that supply can satisfy future demand and thus replenishment is triggered. The inventory monitor can additionally change the state of endpoints to decommission un-needed endpoints or return/exchange/sell overly abundant endpoints.

Figure 7:
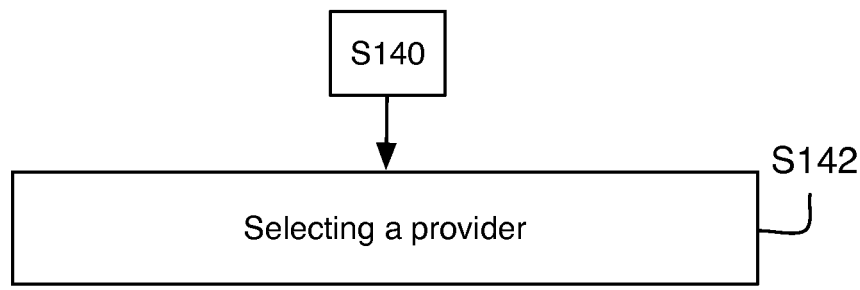
FIG. 7 is a flow diagram of variations of transferring a set of endpoints.

Block S140, which includes transferring a set of endpoints with an inventory source, functions to initiate or complete an inventory order. Transferring of endpoints can include obtaining, removing/releasing, trading, or any suitable exchange of endpoints either in or out of the communication platform. Transferring a set of endpoints can include generating an endpoint transfer request. The transfer request will preferably specify the type of endpoints requested and the classifiers from the classification grouping. The transfer request can include a request endpoints from one classification grouping, but may additionally request endpoints for multiple classification groupings. Additionally, specific endpoints may be specified as being transferred out of the communication platform. The transfer of a set of endpoints is preferably made with a request for endpoints with characteristics or traits identified in Block S130. Transfer of the endpoints preferably includes selecting a provider S142 as shown in FIG. 7. In some cases, executing a transfer of endpoints is executed through a programmatic interface. However, some providers may lack such an interface. Transferring a set of endpoints can include generation of an endpoint request order or form. Alternatively, transferring a set of endpoints may include providing an interface for notifying an administrator of endpoint characteristics for an order (e.g., an alert that endpoints for particular area code have a low supply to demand ratio), and an interface for porting or entering new endpoints.

Selecting a provider S142 functions to identify a source for a new telephony endpoint. A provider is selected if analysis indicates or reports inventory with endpoint property should be replenished. While the usage analysis is primarily focused on inventory replenishment, the inventory monitor can additionally trigger actions for other states of inventory. For example, some events may result in excess inventory and inventory will need to be removed. For example, a user of an endpoint may return or end use of an endpoint. At a certain threshold, endpoint inventory may exceed a maximum threshold, and in response, excess inventory is retired, repurposed, returned/sold to the original owner, exchanged for other telephony inventory, and/or managed in any suitable manner. A provider is preferably selected based on the inventory classification triggering the inventory request—providers may have varying preference based on the characteristics of the desired inventory. Selecting a provider can additionally account for cost, availability, reliability score of a provider (which may be based on inventory history and monitoring), contracts (e.g., a contract or other pre-defined rules may specify numbers of telephony endpoints that should be obtained in a set time frame from a particular provider), and/or any suitable property. While the inventory is preferably ordered to satisfy inventory need of at least one inventory classification, inventory requests may additionally be batched such that several inventory classifications can be replenished through a single telephony endpoint request to a provider. Inventory requests may be queued or held for a set amount of time to allow for other requests to come in. A single provider may be selected to provide telephony endpoints of all the endpoint requests; alternatively, multiple providers may be selected to supply the endpoints.

In a preferred scenario, the selected provider has an API for requesting telephony endpoints. Depending on the selected provider, an API request can be submitted. The request may specify properties of the requested telephony endpoints. Obtaining telephony endpoints through an API is preferably automatically performed. In one variation, a selected provider may not provide an API or other programmatic way of requesting more endpoint inventory. Inventory may require an order form to be submitted through mail, online, and/or over the phone. As a semi-automatic approach, the form can be automatically completed and transmitted to the appropriate party. In one case, a digital file or a printout of a telephony endpoint request form may be automatically completed and then sent to an administrator of the platform. The administrator can then complete delivery of the order with the provider (e.g., send in the mail or in an email). In another variation, an order may not be completed, but an alert message can be transmitted to an administrator or other entity to inform them of the inventory request. The inventory request will preferably include the number of telephony endpoints needed, the provider(s) from which they should be obtained, and any special requests for the endpoints. Transfer of the endpoints preferably includes updating of outside records to direct communications to those endpoints to the platform. In other words, the telephony endpoints are terminated at an IP address of the platform, such that communications are directed or forwarded to this controlled machine address where the platform can take appropriate action. In one variation, the endpoints may be binded through a whitelisted URI. After the order is confirmed, and the telephony endpoint addresses are delivered to the platform, a record is preferably created for each telephony endpoint added to the inventory repository. However, analysis of the endpoint may at least be partially completed prior to adding a record of the telephony endpoints.

Block S150, which includes selectively adding endpoints from the inventory source to the endpoint repository, functions to process, verify, and/or integrate any obtained inventory into the system. Upon fulfillment of the endpoint transfer request, the method preferably adds a set of new endpoints to the communication platform. Newly added endpoints are preferably added in an unavailable unallocated state. The endpoints may be made available after enrolling them (e.g., through a quality check and property check). In the case where endpoints were only transferred out of the system Block S150 may not be performed. However, when new inventory is added to the system, selectively adding endpoints form the inventory source includes analyzing obtained endpoint inventory. As one aspect of obtained inventory analysis, the obtained inventory may be inspected to verify that the endpoints match the desired characteristics and quantity. In some implementations, a provider of endpoints may provide telephony endpoints from a generic pool of endpoints. In other words, the provider may not deliver telephony endpoints matching particular characteristics. When verifying characteristics of the endpoint, undesirable telephony endpoints can be filtered out of the obtained telephony inventory. The undesired inventory may be returned to the provider and/or managed in any suitable manner. For example, the inventory monitor may request more telephone numbers with a 415 area code. If any numbers supplied by the provider do not have a 415 area code, the telephony numbers are returned to the provider. As another aspect, the inventory monitor or another component can perform automated testing of telephony endpoint capabilities. Tested capabilities can include capability of receiving calls, making calls, receiving messages, routing to client applications, and/or performing other suitable tasks.

Figure 8:
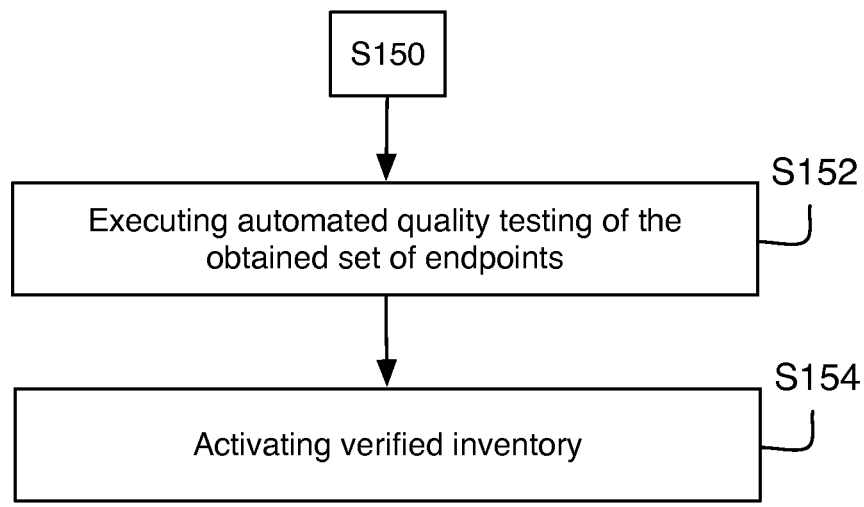
FIG. 8 is a flow diagram of variations of selectively adding endpoints to the endpoint repository.

Selectively adding endpoints to the endpoint repository S150 preferably includes executing automated quality testing of the obtained set of endpoints S152 as shown in FIG. 8. Communication testing may additionally be performed between different geographic regions and/or between different types of devices. If an obtained telephony endpoint fails to pass a test, the telephony endpoint may be returned to the provider (depending on the desired capabilities of the telephony endpoint). As another aspect, analyzing the obtained endpoint inventory may include placing an endpoint in quarantine, evaluating a cleanliness score, and managing the endpoint according to cleanliness thresholds. The quarantine and cleanliness score is preferably generated and managed in a manner substantially similar to the system and process described in U.S. Pat. No. 8,416,923, issued 9 Apr. 2013, which is hereby incorporated in its entirety by this reference. Preferably, an obtained telephony endpoint is monitored for a duration of time (e.g., one month), and the number of incoming communication to the number is monitored. An incoming communication is an indicator that the telephony endpoint is dirty. Since the telephony endpoint has been transferred and is currently not in use, the telephony endpoint would ideally not receive any incoming communications. However, some incoming calls may still occur due to use of the telephony endpoint by a previous owner. Also, incoming calls may occur if the telephony endpoint is close to another popular telephony endpoint. Once the frequency of the incoming calls falls below a particular threshold (i.e., cleanliness indicates the telephony endpoint is satisfactorily "clean"), the cleanliness analysis may be satisfied. Automated testing of the endpoint can additionally include testing different operations such as sending test messages and/or placing test calls to various endpoint categories. Additionally, stored information of the endpoint may be accessed. As described above, information about an endpoint may be collected prior to managing the endpoint. Communications facilitated by the communication platform may have previously communicated with the endpoint or alternative data sources may provide information.

As shown in FIG. 8, selectively adding endpoints S150 can additionally include activating verified inventory S154, which functions to integrate the obtained telephony endpoints that satisfy the requirements. As mentioned above, a record in the inventory repository is preferably created for the added telephony endpoints. The telephony endpoints are preferably added to the inventory repository as an actively available endpoint. A record for a telephony endpoint can additionally store properties of the number, which can include a unique identifier of the telephony endpoint, the direct inbound address (e.g., the phone number of short code), origin properties, a cleanliness/quality score, capability properties (e.g., SMS, MMS, Fax, etc.), status (e.g., mobile, landline, client application, tool free, etc.), and/or other suitable properties of a telephony endpoint. Origin properties can includes NPs (e.g., area code), NXX (e.g., three digit vanity digits of a number—also referred to as an exchange code), vanity addressing patterns, ISO country codes, region properties and/or any suitable origin properties. Vanity addressing patterns can include digit codes that are easy to remember or digit patterns that correspond to common words (using the telephone key to letter mapping). The record may additionally include classification of the number to facilitate tracking of different telephony endpoint classifications by the inventory monitor. The telephony endpoint is preferably initially added in an available state, where new telephony endpoint requests can select the telephony endpoint for use. In some variations, a user may have reserved the telephone endpoint in which case the telephony endpoint may be directly added to the associated account. In one variation, endpoints may still be added to the inventory if they satisfy quality conditions for a subset of capabilities or endpoint categories. In this variation, adding the endpoint can include adding an endpoint to the endpoint repository with limited communication capabilities. The limited communication capabilities can include excluding particular communication forms such as messaging (SMS or MMS), voice, video, and/or any suitable medium of communication. More specifically, an endpoint may be made available for only one communication medium or a set of communication mediums. For example, an endpoint may not satisfy the quality conditions for voice communication (e.g., the number is dirty in the sense that many unwanted voicecalls go to the number), but the number may be suitable for messaging since it has never been used for messaging in the past—the number may be added to the endpoint repository with no voice capabilities but with enabled messaging capabilities. Similarly, an endpoint may be limited to particular regions. An endpoint may be limited to only communicating within one country due to poor quality in international calls. Endpoints with limited capabilities may be offered at a discounted or lower rate.

The method can additionally include providing an API to endpoint inventory information S160. During the management of the endpoint repository substantial information can be collected to facilitate control monitoring of endpoint supplies. The provided API may be used internally in the communication platform, but the API may additionally be exposed publically for use by outside entities. The API preferably provides insight into metadata surrounding a phone number.

Figure 10:
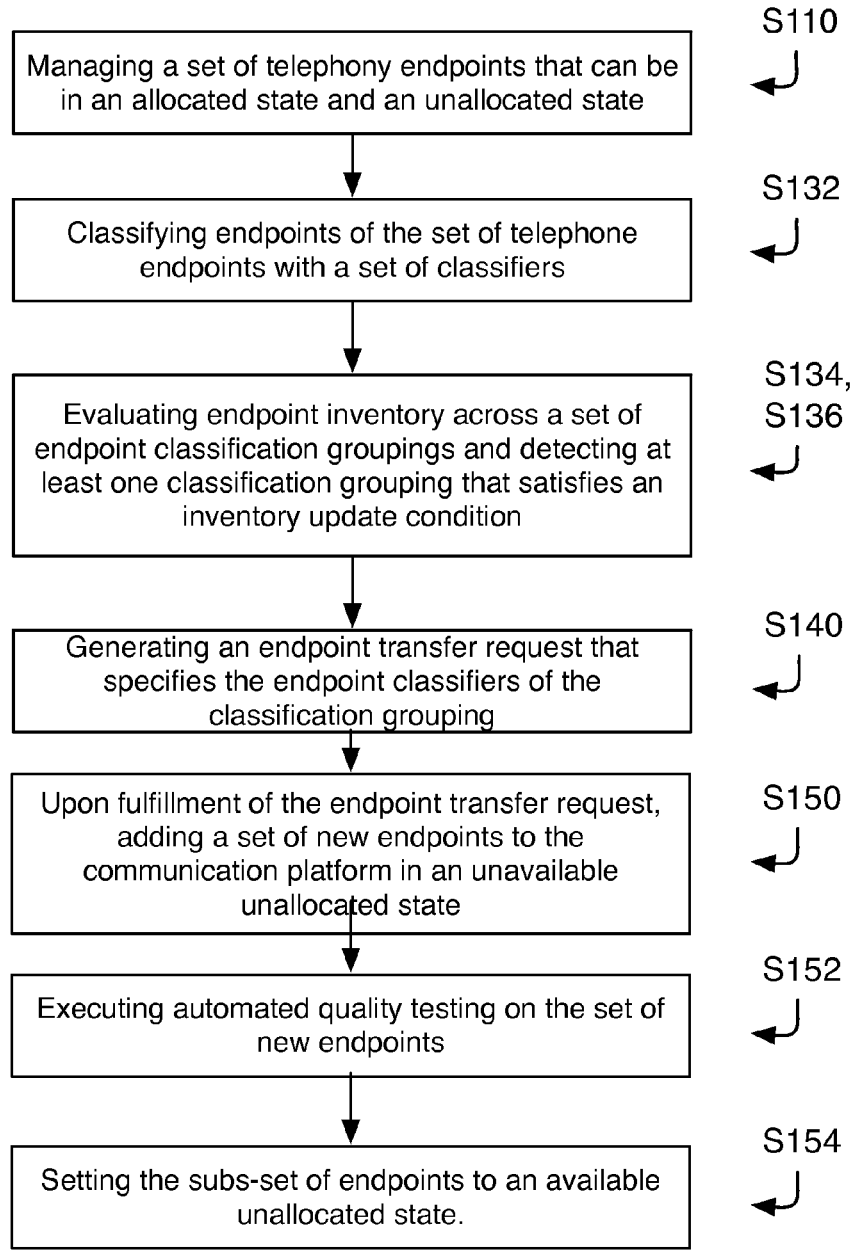
FIG. 10 is a detailed flow diagram of a method of a preferred embodiment.

As shown in FIG. 10, an implementation of a preferred embodiment as described herein may include managing a set of telephone endpoints that can be in an allocated state or an unallocated state; classifying endpoints of the set of telephone endpoints with a set of classifiers; evaluating endpoint inventory across a set of endpoint classification groupings and detecting at least one classification grouping that, based in part on the allocated and unallocated state of corresponding endpoints, satisfies an inventory update condition; generating an endpoint transfer request that specifies the endpoint classifiers of the classification grouping; and selectively adding endpoints from the inventory source to the endpoint repository. The classifiers may include classifiers of inherent endpoint properties and/or classifiers of quality evaluations. More specifically, an implementation of a preferred embodiment can include managing a set of telephony endpoints that can be in an allocated state and an unallocated state, wherein an endpoint in an allocated state is mapped to a user of the communication platform and an endpoint in an unallocated state is unmapped; classifying endpoints of the set of telephone endpoints with a set of classifiers including at least a numbering plan area code classifier, a mobile capability classifier, and a quality classifier; evaluating endpoint inventory across a set of endpoint classification groupings and detecting at least one classification grouping that, based in part on the allocated and unallocated state of corresponding endpoints, satisfies an inventory update condition; generating an endpoint transfer request that specifies the endpoint classifiers of the classification grouping; upon fulfillment of the endpoint transfer request, adding a set of new endpoints to the communication platform in an unavailable unallocated state; executing automated quality testing on the set of new endpoints; and for a sub-set of endpoints that satisfy the automated quality testing from the set of new endpoints, setting the subs-set of endpoints to an available unallocated state. The methods may additionally include receiving an endpoint inventory trigger; wherein evaluating endpoint inventory across a set of endpoint classification groupings is initiated in response to the endpoint inventory trigger, which functions to automatically update inventory based on usage.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the telephony endpoint management service and inventory monitor. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for managing a telephone endpoint repository of a communication platform system comprising: at the communication platform system:

managing a set of telephone endpoints that can be in an allocated state or an unallocated state;

classifying telephone endpoints of the set of telephone endpoints with a set of telephone endpoint classifiers;

processing a request to allocate a telephone endpoint to an account of the communication platform system and transition the telephone endpoint to an allocated state, the telephone endpoint being managed at the communication platform system, the account being associated with an entity that is external to the communication platform system, the request being received at the communication platform system from an external system of the entity;

responsive to the request to allocate the telephone endpoint, evaluating telephone endpoint inventory across a set of telephone endpoint classification groupings and detecting at least one telephone endpoint classification grouping that, based in part on the allocated and unallocated state of corresponding telephone endpoints, satisfies a telephone endpoint inventory update condition;

generating a telephone endpoint transfer request that specifies the telephone endpoint classifiers of the detected telephone endpoint classification grouping;

upon fulfillment of the telephone endpoint transfer request, adding a set of new telephone endpoints to the communication platform in a quarantined state, each telephone endpoint in the quarantined state being both unavailable and unallocated; and for each telephone endpoint of the set of new telephone endpoints in the quarantined state:

executing automated quality testing on the telephone endpoint by:
  monitoring a number of incoming communications to the telephone endpoint for a duration of time, and determining whether the monitored number of incoming communications for the duration of time is below a threshold number of incoming communications for the duration of time; and
  responsive to a determination that the monitored number is below the threshold number, removing the telephony endpoint from the quarantined state and setting the telephony endpoint to an available and unallocated state,
wherein the set of telephone endpoint classifiers includes at least a communication capability classifier, and a quality classifier,
wherein evaluating telephone endpoint inventory across a set of telephone endpoint classification groupings and detecting at least one telephone endpoint classification grouping that satisfies a telephone endpoint inventory update condition comprises: analyzing usage for a telephone endpoint classification grouping of the allocated telephone endpoint to detect if action should be taken to adjust inventory of the telephone endpoint classification grouping of the allocated telephone endpoint,
wherein analyzing usage for the telephone endpoint classification grouping comprises: accounting for inventory metric history of the telephone endpoint classification grouping to predict expected inventory requirements for the telephone endpoint classification grouping,
wherein generating the telephone endpoint transfer request comprises: selecting a provider for providing the set of new telephone endpoints responsive to the telephone endpoint transfer request,
wherein in a case where the communication platform system detects that action should be taken to adjust inventory of the telephone endpoint classification grouping of the allocated telephone endpoint, the telephone endpoint transfer request specifies the telephone endpoint classification grouping of the allocated telephone endpoint, and the communication platform system selects the provider based on the telephone endpoint classification grouping.

2. The method of claim 1, wherein classifying telephone endpoints of the set of telephone endpoints with a set of telephone endpoint classifiers comprises executing quality testing on a telephone endpoint and generating a quality score classifier for the telephone endpoint.

3. The method of claim 1, wherein classifying telephone endpoints of the set of telephone endpoints with a set of telephone endpoint classifiers comprises classifying a first telephone endpoint along a set of telephone endpoint properties, wherein the set of telephone endpoint classifiers for telephone endpoint properties include numbering plan area code (NPA-NXX) classifier, a mobile capability classifier, and a number pattern classifier.

4. The method of claim 3, wherein classifying telephone endpoints of the set of telephone endpoints with a set of telephone endpoint classifiers comprises executing quality testing on the first telephone endpoint and generating a quality score classifier for the first telephone endpoint.

5. The method of claim 1, wherein the set of telephone endpoint classifiers comprises at least a NPA-NXX classifier, a mobile capability classifier, and a quality classifier.

6. The method of claim 1, further comprising receiving a telephone endpoint inventory trigger; wherein evaluating telephone endpoint inventory across a set of telephone endpoint classification groupings is initiated in response to the telephone endpoint inventory trigger.

7. The method of claim 6, wherein receiving a telephone endpoint inventory trigger comprises detecting a change in the quality of at least one telephone endpoint in the inventory repository.

8. The method of claim 7, wherein detecting a change in the quality of at least one telephone endpoint comprises receiving quality feedback notification through an application programming interface (API).

9. The method of claim 7, wherein detecting a change in the quality of at least one telephone endpoint comprises periodically executing automated quality testing of a telephone endpoint.

10. The method of claim 6, wherein receiving a telephone endpoint inventory trigger comprises processing a request to transition an allocated inventory telephone endpoint to an unallocated state in the inventory repository.

11. The method of claim 6, wherein the inventory trigger is a scheduled trigger.

12. The method of claim 1, wherein setting the telephony endpoint to an available and unallocated state comprises adding the telephone endpoint to the telephone endpoint repository in an available unallocated state with limited communication capabilities.

13. The method of claim 12, wherein adding the telephone endpoint to the telephone endpoint repository in the available unallocated state with the limited communication capabilities comprises excluding messaging communication when in an allocated state.

14. The method of claim 12, wherein adding the telephone endpoint to the telephone endpoint repository in the available unallocated state with the limited communication capabilities comprises excluding voice communication when in an allocated state.

15. The method of claim 1, wherein setting the telephony endpoint to an available and unallocated state comprises verifying that the telephone endpoint conforms to characteristics of a requested telephone endpoint category.

16. The method of claim 1, wherein the telephone endpoints are telephone numbers.

17. The method of claim 16, wherein the telephone numbers include short codes.

18. The method of claim 1, wherein the communication platform system is a multi-tenant communication application platform system where users set up applications for facilitating communications to assigned phone numbers.

19. The method of claim 18,
  wherein a platform API service of the communication platform system receives the request to allocate a telephone endpoint from the external system of the entity and transmits an internal API request to a telephony endpoint management service of the communication platform system,
  wherein responsive to reception of the internal API request, the telephony endpoint management service provides a message to an inventory monitor of the communication platform system to notify the inventory monitor of the telephony endpoint allocation,
  wherein responsive to the message, the inventory monitor evaluates the telephone endpoint inventory across the set of telephone endpoint classification groupings, detects the at least one telephone endpoint classification grouping, generates the telephone endpoint transfer request, and adds the set of new telephone endpoints to the telephone endpoint repository.

20. The method of 19, wherein the request to allocate the telephone endpoint to the account of the communication platform system and transition the telephone endpoint to the allocated state is a telephone endpoint inventory trigger; and wherein evaluating telephone endpoint inventory across a set of telephone endpoint classification groupings is initiated in response to the telephone endpoint inventory trigger.

* * * * *